(12) United States Patent
Wang et al.

(10) Patent No.: US 10,082,433 B2
(45) Date of Patent: Sep. 25, 2018

(54) MULTIPOINT COAL AND ROCK MASS STRESS REAL-TIME MONITORING DEVICE AND METHOD

(71) Applicant: CHINA UNIVERSITY OF MINING AND TECHNOLOGY, Jiangsu (CN)

(72) Inventors: Enyuan Wang, Jiangsu (CN); Yabo Wang, Jiangsu (CN); Xiaofei Liu, Jiangsu (CN); Siheng Wang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 26 days.

(21) Appl. No.: 15/318,877

(22) PCT Filed: Jul. 31, 2015

(86) PCT No.: PCT/CN2015/085648
§ 371 (c)(1),
(2) Date: Dec. 14, 2016

(87) PCT Pub. No.: WO2016/019824
PCT Pub. Date: Feb. 11, 2016

(65) Prior Publication Data
US 2017/0122822 A1    May 4, 2017

(30) Foreign Application Priority Data

Aug. 4, 2014 (CN) .......................... 2014 1 0379604

(51) Int. Cl.
*G01L 5/00* (2006.01)
*E21C 39/00* (2006.01)
*E21F 17/18* (2006.01)

(52) U.S. Cl.
CPC ............ *G01L 5/0004* (2013.01); *E21C 39/00* (2013.01); *E21F 17/18* (2013.01)

(58) Field of Classification Search
CPC ......... G01L 5/0004; G01L 5/00; E21C 39/00; E21F 17/18; E21B 49/006
USPC ........................................................... 73/784
See application file for complete search history.

(56) References Cited

U.S. PATENT DOCUMENTS

| 6,842,152 B2 | 1/2005 | Kikuchi |
| 9,885,218 B2 * | 2/2018 | Heijnen ................. E21B 23/14 |
| 2010/0050762 A1 | 3/2010 | Nold, III et al. |

FOREIGN PATENT DOCUMENTS

| CN | 101514925 A | 8/2009 |
| CN | 102230375 A | 11/2011 |
| CN | 202485845 U | 10/2012 |
| CN | 103512693 A | 1/2014 |

(Continued)

*Primary Examiner* — Jonathan Dunlap
*Assistant Examiner* — Octavia Hollington
(74) *Attorney, Agent, or Firm* — Saliwanchik, Lloyd & Eisenschenk

(57) ABSTRACT

A multipoint coal and rock mass stress real-time monitoring device is provided. The device is composed of a plurality of capsule pressure sensors (1), connection rods (2), three-way valves (3), a multichannel monitor (4), a multichannel control valve (5), first high-pressure oil pipes (6), second high-pressure oil pipes (7), third high-pressure oil pipes (8), a four high-pressure oil pipe (9), a high-pressure oil pump (10) and monitoring substations (11). A multipoint coal and rock mass stress real-time monitoring method is also provided.

1 Claim, 3 Drawing Sheets

(56) References Cited

FOREIGN PATENT DOCUMENTS

CN 104132761 A 11/2014
JP 2004012183 A 1/2004

* cited by examiner

MULTIPOINT COAL AND ROCK MASS STRESS REAL-TIME MONITORING DEVICE AND METHOD

CROSS REFERENCE TO RELATED APPLICATIONS

This application is a National Stage Application of International Application Number PCT/CN2015/085648, filed Jul. 31, 2015; which claims priority to Chinese Application No. 201410379604.1, filed Aug. 4, 2014; all of which are incorporated herein by reference in their entirety.

FIELD OF THE INVENTION

The present invention relates to multipoint coal and rock mass stress real-time monitoring device and method, particularly is applicable to synchronous monitoring of virgin rock stress or mining-induced stress at multiple measuring points in multiple drilled holes in a coal and rock mass, and belongs to the technical field of mine stress monitoring.

BACKGROUND OF THE INVENTION

In a downhole mining process of resources such as coal, the mining activity damages the original stress equilibrium state in the coal rock, and results in redistribution of stress around the mining space, forming a "three-area" distribution. Mine pressure behavior phenomena such as roof caving and weighting, roof-to-floor convergence, support compression and fracturing under load, and dynamic phenomena such as water inrush, coal and gas outburst, and rock burst, etc., may occur around the stope and mining roadways, owing to surrounding rock deformation, displacement, and damage under the action of stress in the surrounding rocks.

The stress intensity in a coal and rock mass is a fundamental parameter in prevention and control of coal rock dynamic disasters, such as coal mining, support and roof design, rock burst and coal and gas outburst, etc. Testing and evaluating the stress in the coal and rock mass is a major task in mine pressure observation. Therefore, monitoring the stress in the coal and rock mass in real time provides a decision basis for solving major technical problems, such as control of mine pressure in roadways affected by mining, mining procedure design, appropriate selection and maintenance of roadway position, prediction and control of rock burst and coal and gas outburst, and safe mining of coal mass above confined aquifer, etc.

The stresses in the coal and rock mass are balanced in overall and coupled with each other before the coal and rock mass affected by the mining; under the impact of mining, local mining-induced stresses or energy is accumulated or dissipated, and the stresses at different positions on the same axis are different with each other. In the past, the stress measurement is mainly focused on individual measuring points, and synchronous measurement of stresses at multiple measuring points on an axis in the coal and rock mass cannot be achieved; hence, the synchronous variations of stresses at the points in the drilling depth direction cannot be reflected. Such measurements are far from enough for revealing the rule of stress distribution and synchronous variation in a coal and rock mass. In contrast, utilizing sensors in different depths in different drilled holes, the stress variation in different depths in a coal and rock mass can be reflected; the synchronous and real-time monitoring of stresses at multiple measuring points is closer to the actual engineering situation. Therefore, monitoring the stresses at multiple measuring points in the coal and rock mass synchronously is of great practical significance and reference value for revealing the rule of stress distribution, determining the risk of dynamic disasters, and preventing and controlling dynamic disasters of coal rocks.

Coal and rock mass stress testing is a very complex engineering. At present, many payoffs have been achieved in coal and rock mass stress testing and monitoring. Stress monitoring methods, such as flat jack method, stress-relief method, hydraulic fracturing method, electromagnetic radiation method, sound emission method, etc., have been put forth; and stress monitoring devices, such as CSIRO hollow inclusion strain gauge, UNSW hollow inclusion strain gauge, small-bore hydraulic cracking ground stress testers, telescopic mounter head of deep-hole ground stress detector, borehole deformation gauge, oil pressure pillow, etc., have been developed. However, all of these methods and devices cannot be used to realize real-time monitoring of the stresses at different depths in a drilled hole in a coal and rock mass. Hence, it is very necessary to design a device for synchronously monitoring the stresses at different depths in a drilled hole in a coal and rock mass, which is easy to install and highly adaptive.

CONTENTS OF THE INVENTION

Technical Problem

In order to solve the problems in coal and rock mass stress testing in the prior art, such as complex and difficult operation, single testing scheme, and poor adaptability and timeliness in the monitoring of mining-induced stress, etc., the present invention provides a multipoint coal and rock mass stress monitoring device and method, which can monitor the stress and stress variation at multiple measuring points in a coal and rock mass in real time, is adaptive to different coal and rock masses under load (original coal and rock masses and fractured coal and rock masses), and is easy to operate.

Technical Solution

The multipoint coal and rock mass stress real-time monitoring device provided in the present invention comprises: capsule pressure sensors, connection rods, three-way valves, a multi-channel monitor, a multi-channel control valve, first high-pressure oil pipes, second high-pressure oil pipes, third high-pressure oil pipes, fourth high-pressure oil pipes, a high-pressure oil pump, and monitoring substations; there are a plurality of capsule pressure sensors; the capsule pressure sensors are connected serially via the connecting rods, and the connecting rods are in the same quantity as the capsule pressure sensors; each capsule pressure sensor is connected with a first high-pressure oil pipe, which runs through a connecting rod and is connected to a three-way valves, and connected to the multi-channel monitor and the multi-channel control valve via the three-way valves, and the multi-channel control valve is connected to the high-pressure oil pump.

A multipoint coal and rock mass stress real-time monitoring method utilizing the above-mentioned device, comprising the following steps:

a. determining a monitoring area and positions of holes to be drilled according to the monitoring demand, and determining a drilling depth according to the number of monitoring points arranged in the holes to be drilled and monitoring positions;

b. drilling holes in the coal and rock mass to a specified depth;
c. determining the length of each connecting rod according to the stress monitoring scheme, connecting the capsule pressure sensors serially via the connecting rods, running the first high-pressure oil pipes connected with the capsule pressure sensors through the connecting rods and leading out of the drilled holes, and putting the capsule pressure sensors into the drilled holes to predetermined positions;
d. connecting the second high-pressure oil pipes and the third high-pressure oil pipes led out of the drilled holes to the multi-channel monitor and the multi-channel control valve via the three-way valves respectively, and connecting the multi-channel control valve to the high-pressure oil pump;
e. injecting oil through the high-pressure oil pump into the capsule pressure sensors via the multi-channel control valve and holding the pressure to increase steadily; when the pressure reaches a preset pressure and remains stable, stopping oil injection, closing the three-way valves, removing the multi-channel control valve and the high-pressure oil pump, and sealing the oil injection hole with a plug;
f. sensing the stress in the coal and rock mass with the capsule pressure sensors, synchronously acquiring, converting, storing, and displaying the data with the multi-channel monitor, or transmitting the data to a remote monitoring center through monitoring substations, and determining the real-time stress distribution and stress variation at different positions in the drilled hole by analyzing the monitoring data.

Beneficial Effects

The device and method provided in the present invention are mainly used to monitoring the stress continuously in real time at multiple measuring points in multiple drilled holes in a virgin rock mass or fractured coal and rock mass. By deploying multipoint coal and rock mass stress real-time monitoring devices in multiple drilled holes, regional stress monitoring can be performed, and the rule of stress distribution and variation in the stress field in the entire region can be analyzed and determined. Compared with the prior art, the device and method provided in the present invention can monitor the stress at different positions on an axis in real time, and are easy and simple to install and operate, and the capsule pressure sensors couple well with the coal and rock mass; the device and method have high adaptability and stability, have little impact on the production, are essentially immune to external interferences such as manpower etc. and not affected by the degree of fracturing of the coal and rock mass, continuous test can be carried out in virgin rock masses and fractured coal and rock masses, and are especially suitable for monitoring the variation rule of ground stress in a fractured coal and rock mass depending on the mining distance. The data monitored by the device is acquired, converted, stored, and displayed by a multi-channel monitor, and can be transmitted to a remote monitoring center through monitoring substations, and then transmitted to terminal computers, so that the magnitude and variation of ground stress can be viewed or analyzed in computer software on the ground surface. By deploying multipoint coal and rock mass stress real-time monitoring devices in multiple drilled holes, regional stress monitoring can be performed, and the rule of stress distribution and variation in the stress field in the entire region can be analyzed and determined.

DETAILED DESCRIPTION OF THE EMBODIMENTS

Hereunder the present invention will be detailed in an embodiment with reference to the accompanying drawings.

Embodiment 1

Figure 1:
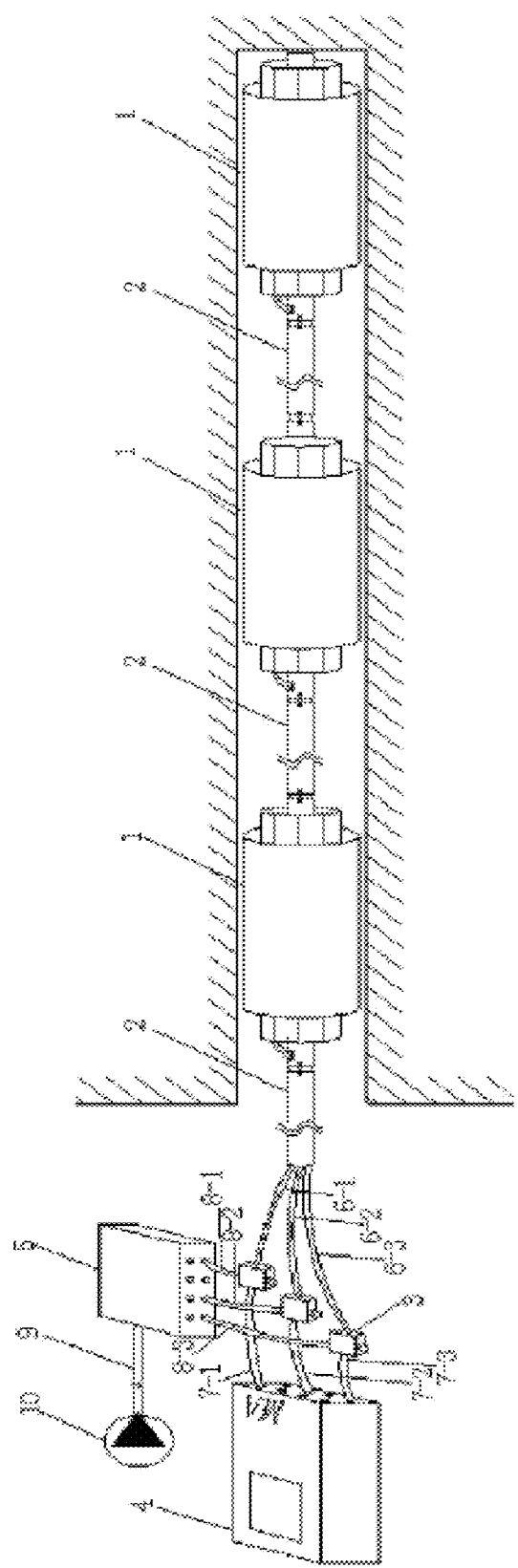
FIG. 1 is a schematic structural diagram of the multipoint coal and rock mass stress real-time monitoring device according to the present invention.

As shown in the schematic structural diagram of the multipoint coal and rock mass stress real-time monitoring device in FIG. 1, the device mainly is composed of: capsule pressure sensors 1, connection rods 2, three-way valves 3, a multi-channel monitor 4, a multi-channel control valve 5, first high-pressure oil pipes 6, second high-pressure oil pipes 7, third high-pressure oil pipes 8, fourth high-pressure oil pipes 9, and a high-pressure oil pump 10. The number of the capsule pressure sensors 1 can be determined according to the requirement; 3 capsule pressure sensors are used herein as shown in FIG. 1; a plurality of capsule pressure sensors 1 are connected serially via the connecting rods 2, and the connecting rods 2 are in the same quantity as the capsule pressure sensors 1; each capsule pressure sensor 1 is connected with a first high-pressure oil pipe 6, which runs through a connecting rod 2 and is connected to a three-way valves 3, and connected to the multi-channel monitor 4 and the multi-channel control valve 5 via the three-way valves 3, and the multi-channel control valve 5 is connected to the high-pressure oil pump 10. The two ends of the connecting rod 2 are connected with the terminal end of the previous capsule pressure sensor 1 and the head end of the next capsule pressure sensor 1, the first high-pressure oil pipe 6 is connected with the first capsule pressure sensor 1 and passes through the connecting rod 2, runs out of the drilled hole sequentially, and connected to the three-way valves 3, the second end of the three-way valve 3 is connected to the multi-channel monitor 4 via the second high-pressure oil pipe 7, and the third end of the three-way valves 3 is connected to the multi-channel control valve 5 via the third high-pressure oil pipe 8, the multi-channel control valve 5 is connected to the high-pressure oil pump 10 via the fourth high-pressure oil pipe 9.

Figure 2:
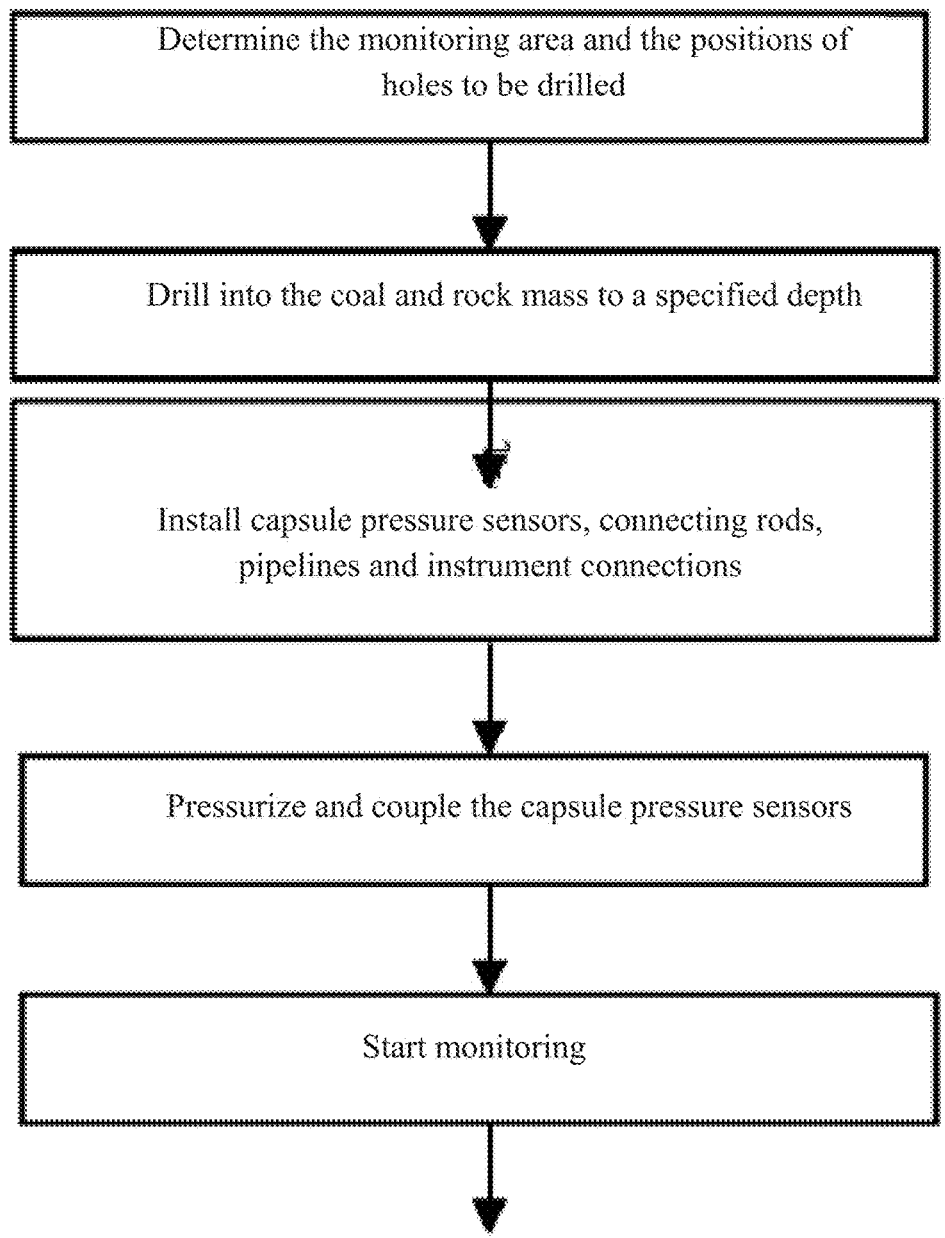
FIG. 2 is a working flow diagram of multipoint real-time coal and rock mass stress monitoring according to the present invention.
Figure 3:
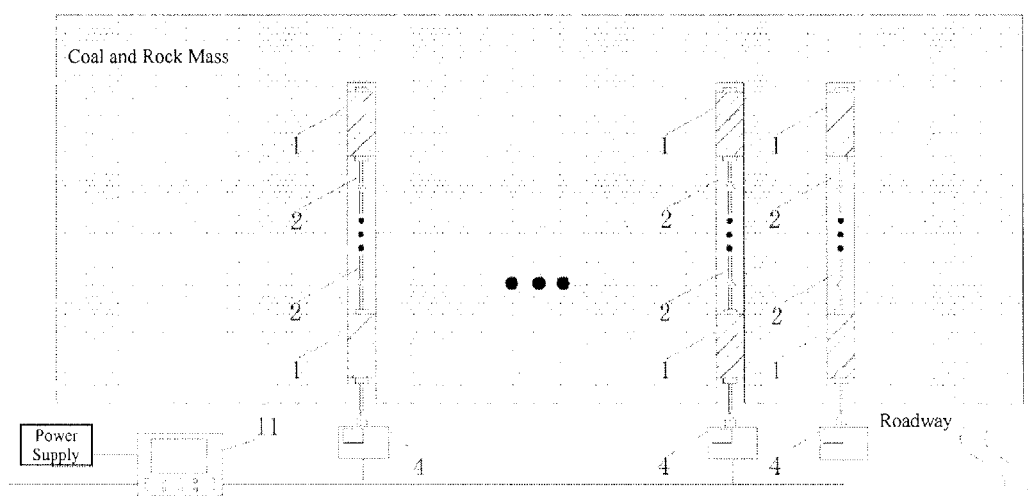
FIG. 3 is a schematic structural diagram of the multi-hole multipoint coal and rock mass stress real-time monitoring device according to the present invention.
In the figures: 1—capsule pressure sensor; 2—connecting rod; 3—three-way valves; 4—multi-channel monitor; 5—multi-channel control valve; 6—first high-pressure oil pipe; 7—second high-pressure oil pipe; 8—third high-pressure oil pipe; 9—fourth high-pressure oil pipe; 10—high-pressure oil pump; 11—monitoring substation

As shown in FIG. 2, the multipoint coal and rock mass stress real-time monitoring method comprises the following steps:

determining a monitoring area and positions of holes to be drilled according to the monitoring demand, and determining a drilling depth according to the number of monitoring points arranged in the holes to be drilled and monitoring positions; drilling holes in the coal and rock mass to a specified depth; determining the length of each connecting rod 2 according to the stress monitoring scheme, connecting the capsule pressure sensors 1 serially via the connecting rods 2, running the first high-pressure oil pipes 6 connected with the capsule pressure sensors 1 through the connecting rods 2 and leading out of the drilled holes, and putting the capsule pressure sensors 1 into the drilled holes to predetermined positions; connecting the second high-pressure oil pipes 7 and the third high-pressure oil pipes 8 led out of the drilled holes to the multi-channel monitor 4 and the multi-channel control valve 5 via the three-way valves 3 respectively, and connecting the multi-channel control valve 5 to the high-pressure oil pump 10; injecting oil through the high-pressure oil pump 10 into the capsule pressure sensors 1 via the multi-channel control valve 5 and holding the pressure to increase steadily; when the pressure reaches a preset pressure and remains stable, stopping oil injection, closing the three-way valves 3, removing the multi-channel control valve 5 and the high-pressure oil pump 10, and sealing the oil injection hole with a plug; sensing the stress in the coal and rock mass with the capsule pressure sensors, synchronously acquiring, converting, storing, and displaying the data with the multi-channel monitor 4, or transmitting the data to a remote monitoring center through monitoring substations 11, and determining the real-time stress distribution and stress variation at different positions in the drilled hole by analyzing the monitoring data.

The invention claimed is:

1. A multipoint coal and rock mass stress real-time monitoring method utilizing a multipoint coal and rock mass stress real-time monitoring device, the device comprising: a plurality of capsule pressure sensors, connection rods, three-way valves, a multi-channel monitor, a multi-channel control valve, first high-pressure oil pipes, second high-pressure oil pipes, third high-pressure oil pipes, fourth high-pressure oil pipes, a high-pressure oil pump and monitoring substations, wherein the capsule pressure sensors are connected serially via the connecting rods, and the connecting rods are in the same quantity as the capsule pressure sensors; each capsule pressure sensor is connected with a first high-pressure oil pipe, which runs through a connecting rod and is connected to a three-way valve, and connected to the multi-channel monitor and the multi-channel control valve via the three-way valves, and the multi-channel control valve is connected to the high-pressure oil pump, the method comprising the following steps:
a) determining a monitoring area and positions of holes to be drilled according to monitoring demand, and determining a drilling depth according to the number of monitoring points arranged in the holes to be drilled and monitoring positions;
b) drilling holes in a coal and rock mass to a specified depth;
c) determining the length of each connecting rod according to a stress monitoring scheme, connecting the capsule pressure sensors serially via the connecting rods, running the first high-pressure oil pipes connected with the capsule pressure sensors through the connecting rods and leading out of the drilled holes, and putting the capsule pressure sensors into the drilled holes to predetermined positions;
d) connecting the second high-pressure oil pipes and the third high-pressure oil pipes led out of the drilled holes to the multi-channel monitor and the multi-channel control valve via the three-way valves respectively, and connecting the multi-channel control valve to the high-pressure oil pump;
e) injecting oil through the high-pressure oil pump into the capsule pressure sensors via the multi-channel control valve and holding the pressure to increase steadily; when the pressure reaches a preset pressure and remains stable, stopping oil injection, closing the three-way valves, removing the multi-channel control valve and the high-pressure oil pump, and sealing oil injection holes with a plug; and
f) sensing the stress in the coal and rock mass with the capsule pressure sensors, synchronously acquiring, converting, storing, and displaying the data with the multi-channel monitor, or transmitting the data to a remote monitoring center through monitoring substations, and determining the real-time stress distribution and stress variation at different positions in the drilled hole by analyzing the monitoring data.

\* \* \* \* \*